United States Patent
Lui et al.

(10) Patent No.: US 9,665,656 B2
(45) Date of Patent: May 30, 2017

(54) AUTOMATED SERVICE SOLUTION DELIVERY

(75) Inventors: King Shing Kelvin Lui, Pickering (CA); Leho Nigul, Richmond Hill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1380 days.

(21) Appl. No.: 13/212,993

(22) Filed: Aug. 18, 2011

(65) Prior Publication Data

US 2013/0047148 A1 Feb. 21, 2013

(51) Int. Cl.
G06F 9/44 (2006.01)
G06F 17/30 (2006.01)
G06F 9/445 (2006.01)

(52) U.S. Cl.
CPC ............ *G06F 17/3089* (2013.01); *G06F 8/65* (2013.01)

(58) Field of Classification Search
CPC ............. H04N 21/8586; H04N 21/854; H04N 21/4722; G06F 2201/875; G06F 21/20; G06F 17/3089; G06F 8/65; H04L 67/34
USPC ........... 717/121, 171, 174; 709/223; 726/25; 707/102; 706/47
See application file for complete search history.

(56) References Cited

U.S. PATENT DOCUMENTS

| | | | |
|---|---|---|---|
| 7,100,085 B2 | 8/2006 | Miller | |
| 7,676,221 B2 | 3/2010 | Roundtree et al. | |
| 7,778,862 B2 | 8/2010 | Vaccarelli et al. | |
| 2002/0052941 A1* | 5/2002 | Patterson | 709/223 |
| 2002/0063735 A1* | 5/2002 | Tamir et al. | 345/745 |
| 2004/0267750 A1 | 12/2004 | Aaron | |
| 2005/0257214 A1* | 11/2005 | Moshir et al. | 717/171 |
| 2005/0288981 A1 | 12/2005 | Elias et al. | |
| 2006/0161895 A1* | 7/2006 | Speeter et al. | 717/121 |
| 2006/0212771 A1 | 9/2006 | Fabbrocino | |
| 2006/0282834 A1* | 12/2006 | Cheng et al. | 717/174 |
| 2007/0192352 A1* | 8/2007 | Levy | 707/102 |
| 2010/0070448 A1* | 3/2010 | Omoigui | 706/47 |
| 2010/0235918 A1* | 9/2010 | Mizrahi et al. | 726/25 |

FOREIGN PATENT DOCUMENTS

JP 17-170614 A 1/2006

* cited by examiner

*Primary Examiner* — Tuan Vu
(74) *Attorney, Agent, or Firm* — Lee Law, PLLC; Christopher B. Lee

(57) ABSTRACT

A group of software update uniform resource locators (URLs) that each reference software support information related to one of a group of initial logical components of a deployed software package are hosted at a software update server. The group of initial logical components represent problem reporting domains of the deployed software package. A request, initiated by a selection at a computing device of one of the software update URLs, for the software support information referenced by the selected software update URL for the one of the group of initial logical components of the software package is detected. The software support information referenced by the selected software update URL for the one of the group of initial logical components is downloaded.

20 Claims, 6 Drawing Sheets

AUTOMATED SERVICE SOLUTION DELIVERY

BACKGROUND

The present invention relates to system serviceability. More particularly, the present invention relates to automated service solution delivery.

Software vendors create a full solution by integrating multiple software products to address customer business requirements. Customer support departments operate to provide customer support for the software products. Customer support department representatives receive inquiries regarding support issues and respond with support information.

BRIEF SUMMARY

A method includes hosting, at a software update server, a plurality of software update uniform resource locators (URLs) that each reference software support information related to one of a plurality of initial logical components of a deployed software package, where the plurality of initial logical components represent problem reporting domains of the deployed software package; detecting a request, initiated by a selection at a computing device of one of the software update URLs, for the software support information referenced by the selected software update URL for the one of the plurality of initial logical components of the software package; and downloading the software support information referenced by the selected software update URL for the one of the plurality of initial logical components.

A system includes a communication interface; and a processor programmed to host a plurality of software update uniform resource locators (URLs) that each reference software support information related to one of a plurality of initial logical components of a deployed software package, where the plurality of initial logical components represent problem reporting domains of the deployed software package; detect a request via the communication interface, initiated by a selection at a computing device of one of the software update URLs, for the software support information referenced by the selected software update URL for the one of the plurality of initial logical components of the software package; and download the software support information referenced by the selected software update URL for the one of the plurality of initial logical components.

A computer program product includes a computer readable storage medium including computer readable program code, where the computer readable program code when executed on a computer causes the computer to host a plurality of software update uniform resource locators (URLs) that each reference software support information related to one of a plurality of initial logical components of a deployed software package, where the plurality of initial logical components represent problem reporting domains of the deployed software package; detect a request, initiated by a selection at a computing device of one of the software update URLs, for the software support information referenced by the selected software update URL for the one of the plurality of initial logical components of the software package; and download the software support information referenced by the selected software update URL for the one of the plurality of initial logical components.

DETAILED DESCRIPTION

Figure 1:
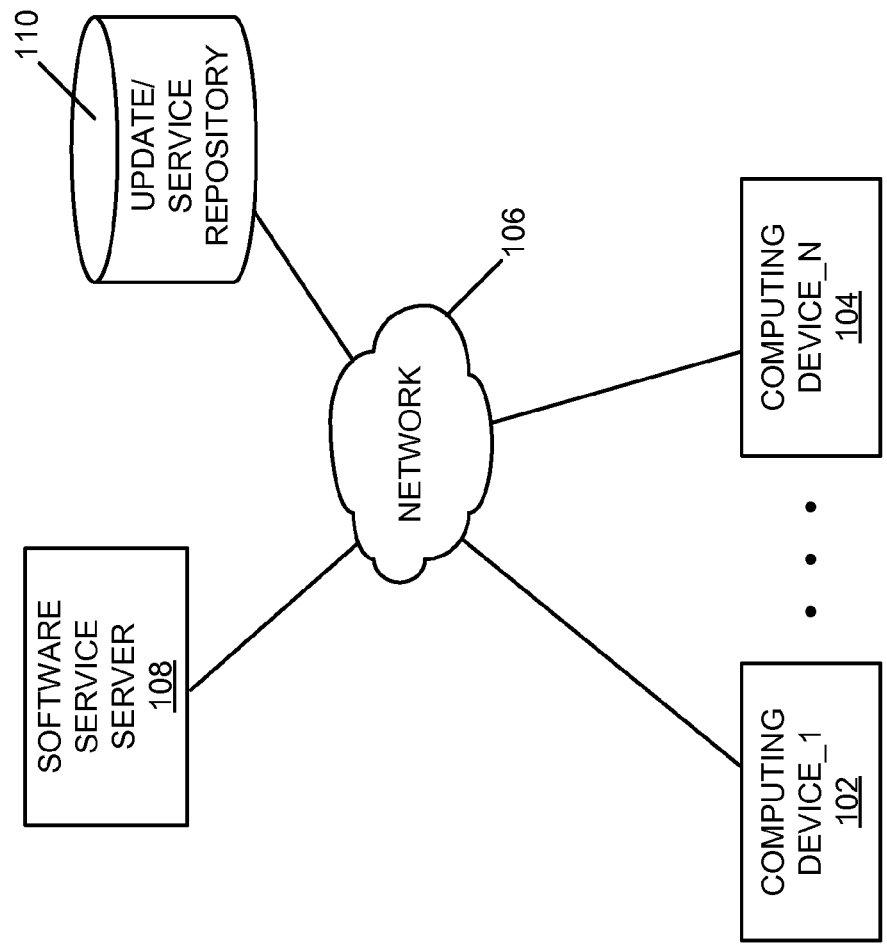
FIG. 1 is a block diagram of an example of an implementation of a system for automated service solution delivery according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated service solution delivery. Within the framework of the present subject matter, a software product solution is modulated into granular logical components within a logical layer that is independent of physical modularity of software. A unique uniform resource locator (URL) is established to host references to recommended fixes for each logical component. The URLs may initially be empty (e.g., without support information content) and may be considered placeholders for support information that is augmented over time. Alternatively, one or more URLs may initially be configured to include documentation links, user group links, and other information, as appropriate for a given implementation. If a problem occurs within a runtime environment with a logical component, an error code and a link (URL) to a repository storing one or more pointers to recommended solutions/fixes is recorded within a log. If no solutions have been previously reported, a customer may utilize the URL to retrieve a customer service number or reporting form to initiate reporting. In response to creation of support information, the repository stores solutions/fixes, installation/upgrade instructions, and other related information (e.g., documentation links, reference blog posts, anything URL addressable) in a compartmentalized and granular manner separately for each logical component. The granularity of the logical components and compartmentalization of solutions and support information may be changed over time to allow dynamic modification of associations between logical components and repository links. For example, the present subject matter may change the reporting scope by changing/augmenting associations and granularity of component and URL solution linkages. As such, the present subject matter provides problem reporting domain solution modularity.

For purposes of the present description, "logical" components represent one or more portions of one or more software components, such as portions associated with a problem reporting domain. However, it should be noted that software does not need to be modular to define logical components. Further, the logical component concept utilized herein represents a level of abstraction that differs from the concept of a physical structure of the software by defining logical relations between functional aspects of software based upon product support objectives. It should also be noted that logical components may be partitioned/defined with a granularity appropriate for the particular partitioning of product support rather than being constrained to partitioning of developed software components within the product solution. As such, logical components may span multiple developed software components, and may also be defined at the software component level or as a portion of a single software component as appropriate for the given implementation granularity.

Regarding solution delivery, if a problem occurs within a runtime environment in association with a defined logical component, the error code and a link (URL) to the repository storing one or more pointers to the recommended fixes is recorded within a log. A customer may review the log and see the exception or error. The customer will also see the URL where the solution to the specific problem may be found. The customer may then select the URL recorded in the log via a processing device and review the recommended fixes, including a description of the issue and related information, such as upgrade/installation instructions or other information as described above. The customer may make a decision to select and try out any recommended solution by downloading the solution from the repository referenced by the one or more pointers, without being required to report the incident to the software vendor support department, and without having to contact customer support or perform an Internet search for the solution to determine where to obtain the solution.

Further, the logical component to URL mappings originally deployed with a product may be enhanced over time by the addition of other URLs and content. The additional URLs and content may be linked via the original URLs to provide a dynamic and flexible product support and problem reporting domain granularity. As such, URLs may be added after a product is released and these URLs are linked from URLs that correspond to pre-defined software components. For example, if a particular product includes the two logical components named component_A and component_B, these components may be linked to a URL_A and a URL_B, respectively. The linkage between the component_A and the URL_A and between the component_B and the URL_B may be maintained during the lifecycle of the product. However, if a problem is identified that involves both the component_A and the component_B and is related to some other logical aspect, such as a SessionManagment problem reporting domain, then a new URL_C may be created and linked to both the URL_A and the URL_B to enhance and change the granularity of the problem reporting domain association with linked solutions.

It should be noted that conception of the present subject matter resulted from recognition of certain limitations associated with software service delivery. For example, it was recognized that serviceability of software systems is important for enterprise customers and that prompt acquisition of a fix/solution to the customer problem may minimize production downtime, and may as such have a direct positive business impact for the customer. It was also recognized that a current customer support mode in the software industry is insufficient to address a recognized need for rapid acquisition of proper fixes to reduce business impact for the customer. Customers have to call customer support or perform Internet searches to find solutions. Both options were recognized to be inefficient and time consuming for the customer/software user. It was additionally recognized that automating service solution delivery may reduce resource requirements for customer support by providing an automated fix/solution delivery to address known issues and may reduce expenses associated with the serviceability of software products. The present subject matter improves software service delivery by providing for automated solution delivery to deliver recommended fixes to the customer to address customer issues, as described above and in more detail below. As such, improved serviceability of software products may be obtained through automated service solution delivery described herein.

An example workflow for the present subject matter may include a customer starting an application server instance (e.g., WebSphere® Application Server) and attempting to deploy Enterprise JavaBeans (EJB®). An error may be thrown if a problem occurs during the deployment. The customer may review the log and determine that a null pointer exception was the actual error that was thrown. The log may include, for example, a URL pointer that references a website support information/content location, such as http://www.company.com/was/ejbcontainer/fixes that hosts a support page for this product component and that provides support information for this particular error. The customer may select the link via their computing device, which results in the computing device requesting the web page from the server. The web page may be populated by the customer's computing device and the customer may review the description of a fix/solution that addresses the EJB® deployment problem to the one customer experienced. The customer may initiate via the computing device a download of the fix/solution directly from the linked web page and attempt to start the application server instance again. As such, the customer is not required to place a support call or sift through hundreds of pages resulting from a web search for a solution to the problem, and the solution may be identified and implemented with reduced customer down time.

The automated service solution delivery described herein may be performed in real time to allow prompt delivery of service suggestions to customers/software users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated service solution delivery. A computing device_1 102 through a computing device_N 104 communicate via a network 106 with a software service server 108. The software service server 108 responds to URL selections to provide support information stored within an update/service repository 110. As described in more detail below in association with the description of FIG. 2, the update/service repository 110 may be combined with the software service server 108 without departure from the scope of the present subject matter.

As will be described in more detail below in association with FIG. 2 through FIG. 5B, the software service server 108 in conjunction with the computing device_1 102 through the computing device_N 104 provides automated service solution delivery. The automated service solution delivery is based upon solution information provided by the update/service repository 110. The automated service solution delivery provides real-time direct access to solutions via hypertext links (URLs) that directly reference solution information for particular problem reporting domains.

It should be noted that the computing device_1 102 through the computing device_N 104 and the software service server 108 may be any computing device capable of processing information as described above and in more detail below. For example, the respective devices may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below. Further, the software service server 108 may include any device capable of providing data for consumption by a device, such as the computing device_1 102 through the computing device_N 104, via a network, such as the network 106. As such, the software service server 108 may include a web server or other data server device.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
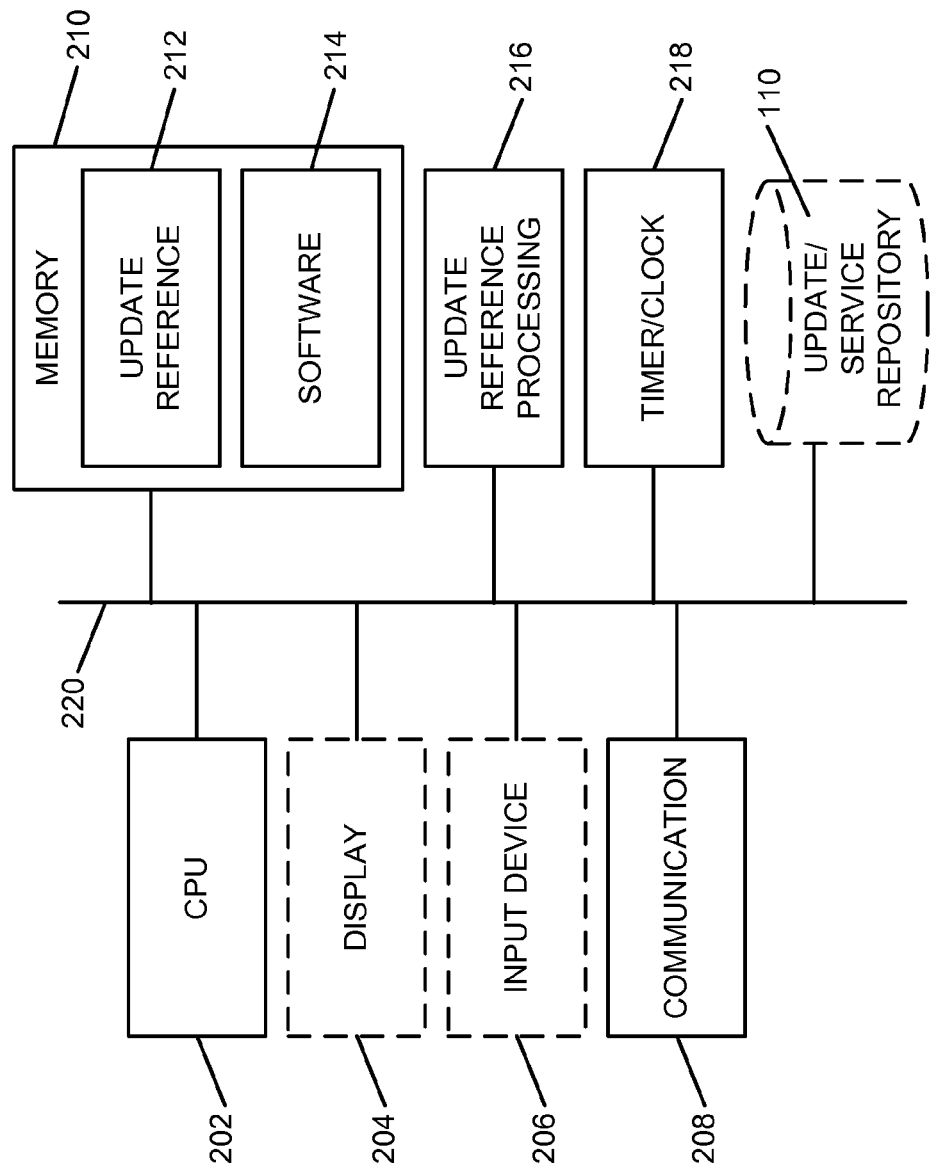
FIG. 2 is a block diagram of an example of an implementation of a core processing module capable of performing automated service solution delivery according to an embodiment of the present subject matter.

FIG. 2 is a block diagram of an example of an implementation of a core processing module 200 capable of performing automated service solution delivery. The core processing module 200 may be associated with either the computing device_1 102 through the computing device_N 104 or the software service server 108, as appropriate for a given implementation. Further, the core processing module 200 may provide different and complementary processing of automated service solution delivery in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the between any of the computing device_1 102 through the computing device_N 104 and the software service server 108, to provide the automated service solution delivery described herein. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes an update reference storage area 212 that stores hosted URLs to support information and mapping between URLs and problem reporting domain mapping, URL selection counters for use in association with modification of problem reporting domain mapping and logical component changes, and other information (e.g., for a server-side implementation). The update reference storage area 212 may also store URL associations with logical components and error logs that include URLs that reference support information (e.g., for a client-side implementation).

A software area 214 stores software, either as software updates for download in association with a support request (e.g., for a server-side implementation). The software area 214 may also store deployed software that forms a solution or portion of a solution that may be monitored during operation for the generation of error logs that include URLs to support information to expedite solution processing, and may store downloaded software support information and fixes (e.g., for a client-side implementation). Many other possibilities exist for storage of information and program content and all are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An update reference processing module 216 is also illustrated. The update reference processing module 216 provides processing for mapping problem reporting domains to logical components for software packages for which URLs are hosted for processing URL-based support requests (e.g., for a server-side implementation), and processing to generate error logs including URLs to support information (e.g., for a client-side implementation) for the core processing module 200, as described above and in more detail below. The update reference processing module 216 implements the automated service solution delivery of the core processing module 200.

Though the update reference processing module 216 is illustrated as a component-level module for ease of illustration and description purposes, it should be noted that the update reference processing module 216 may include any hardware, programmed processor(s), and memory used to carry out the functions of this module as described above and in more detail below. For example, the update reference processing module 216 may include additional controller circuitry in the form of application specific integrated circuits (ASICs), processors, and/or discrete integrated circuits and components for performing communication and electrical control activities associated with the respective devices. Additionally, the update reference processing module 216 may include interrupt-level, stack-level, and application-level modules as appropriate. Furthermore, the update reference processing module 216 may include any memory components used for storage, execution, and data processing for performing processing activities associated with the module.

It should also be noted that the update reference processing module 216 may form a portion of other circuitry described without departure from the scope of the present subject matter. Further, the update reference processing module 216 may alternatively be implemented as an application stored within the memory 210. In such an implementation, the update reference processing module 216 may include instructions executed by the CPU 202 for performing the functionality described herein. The CPU 202 may execute these instructions to provide the processing capabilities described above and in more detail below for the core processing module 200. The update reference processing module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as in association with error log or support request processing to determine a frequency of selection of different URLs associated with logical problem domain reporting for use in automated determination of whether to change logical problem reporting domain partitioning for a particular software package, as described above and in more detail below. As such, the update reference processing module 216 may utilize information derived from the timer/clock module 218 for information processing activities, such as the automated service solution delivery described herein.

The update/service repository 110 is also shown associated with the core processing module 200 to show that the update/service repository 110 may be coupled to the core processing module 200 without requiring a network connection to access updates and service information. The update/service repository 110 is shown in a dashed-line representation to represent that it may be associated, for example, with the core processing module 200 when implemented in association with the software service server 108.

The CPU 202, the display 204, the input device 206, the communication module 208, the memory 210, the update reference processing module 216, the timer/clock module 218, and the update/service repository 110 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the update/service repository 110 is shown as a separate module, the information stored therein may also or alternatively be stored within the memory 210 without departure from the scope of the present subject matter. Accordingly, the core processing module 200 may take many forms and may be associated with many platforms.

FIG. 3 through FIG. 5B below describe example processes that may be executed by devices, such as the core processing module 200, to perform the automated service solution delivery associated with the present subject matter. Many other variations on the example processes are possible and all are considered within the scope of the present subject matter. The example processes may be performed by modules, such as the update reference processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

Figure 3:
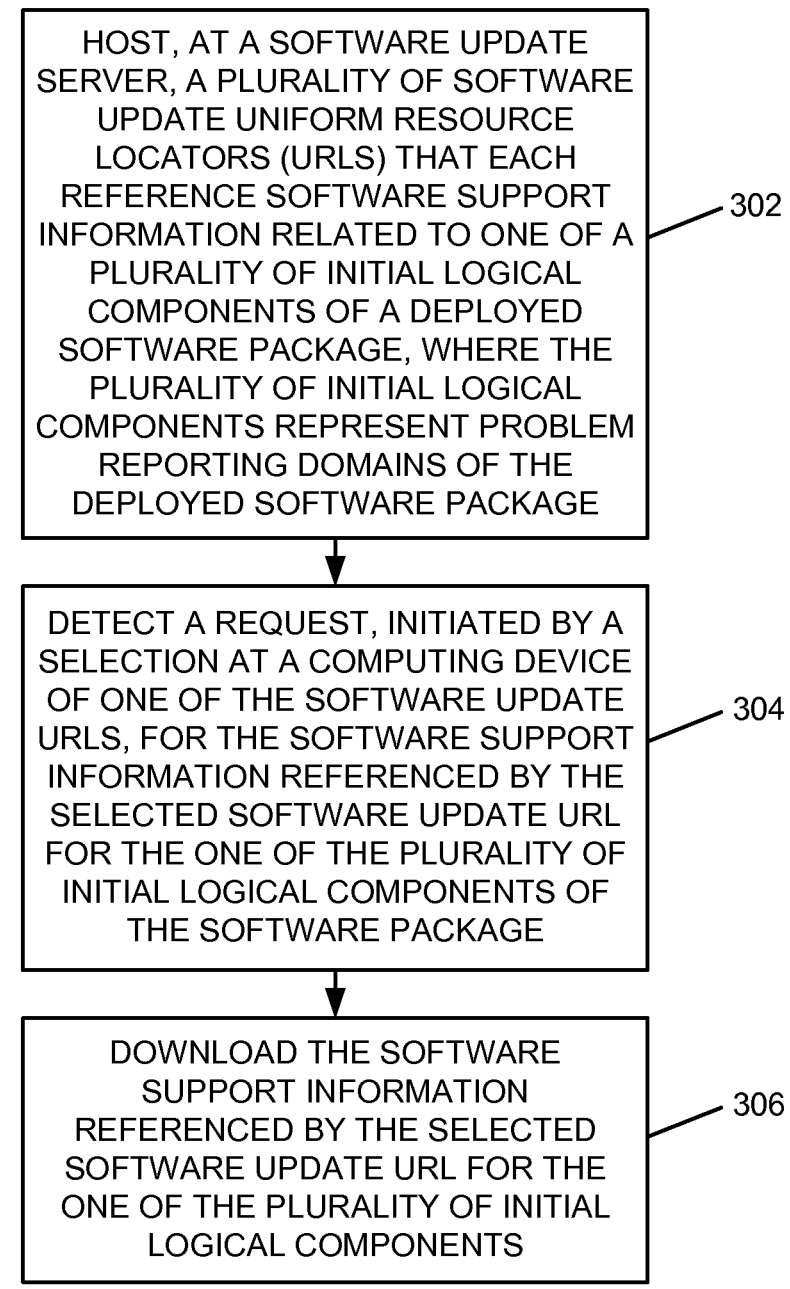
FIG. 3 is a flow chart of an example of an implementation of a process for automated service solution delivery according to an embodiment of the present subject matter.

FIG. 3 is a flow chart of an example of an implementation of a process 300 for automated service solution delivery. At block 302, the process 300 hosts, at a software update server, a plurality of software update uniform resource locators (URLs) that each reference software support information related to one of a plurality of initial logical components of a deployed software package, where the plurality of initial logical components represent problem reporting domains of the deployed software package. At block 304, the process 300 detects a request, initiated by a selection at a computing device of one of the software update URLs, for the software support information referenced by the selected software update URL for the one of the plurality of initial logical components of the software package. At block 306, the process 300 downloads the software support information referenced by the selected software update URL for the one of the plurality of initial logical components.

Figure 4:
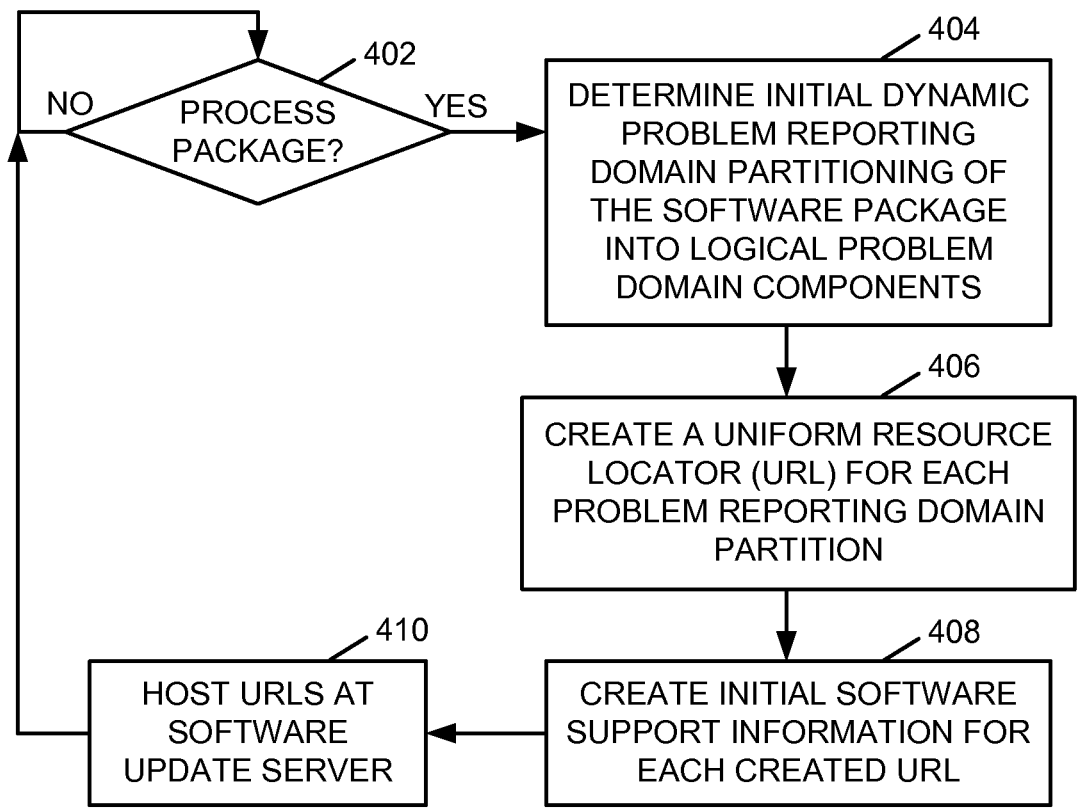
FIG. 4 is a flow chart of an example of an implementation of a process for logical partitioning of software components and initial setup of hosted uniform resource locators (URLs) for support information associated with automated service solution delivery according to an embodiment of the present subject matter.

FIG. 4 is a flow chart of an example of an implementation of a process 400 for logical partitioning of software components and initial setup of hosted uniform resource locators (URLs) for support information associated with automated service solution delivery. At decision point 402, the process 400 makes a determination as to whether a request to process a software package has been detected. A request to process a software package may be detected, for example, in association with a compilation or build process for the software package, in association with initial or updated deployment of the software package, in response to a developer request, or otherwise as appropriate for a given implementation.

In response to determining that a request to process a software package has been detected, the process 400 determines initial dynamic problem reporting domain partitioning (set of problem reporting domains) for the software package into logical problem reporting domain components at block 404. Each initial problem reporting domain logically spans a subset of the plurality of components that form the software package. As described above, the logical partitioning for problem reporting and support information may be based upon partitions other than software component partitioning and may be granular and dynamically modifiable as appropriate for a given implementation. Each of the logical components of the software package may be defined based upon logical problem reporting domain components. Each of the problem reporting domain components may represent a separate problem reporting domain partition for the software package based upon an initial dynamic problem reporting domain determination. Further, each logical problem reporting domain component may include at least a portion of at least one developed software component of the software package.

At block 406, the process 400 creates a uniform resource locator (URL) for each determined initial problem reporting domain partition. Each of the software update URLs may host support information related to one of the identified initial problem reporting domains. At block 408, the process 400 creates initial software support information for each created URL. As such, the process 400 creates web content addressed by each of the software update URLs that comprises software support information related to logical components based upon the identified initial plurality of problem reporting domains represented by each URL. The initial software support information may be automatically generated for each logical problem reporting domain component to describe characteristics of the respective problem reporting domains. For purposes of the present example, it is assumed that there are no fixes to be mapped into the URLs initially and that initially there may be no content (e.g., empty). However, initial content may be provided that includes customer support contact information or a link to a reporting form or other default initial content, which may be utilized for initial reporting or for a situation where a particular posted solution is inapplicable to a particular customer issue. Additional subject matter and links may be provided, for example, to reference a subject area, documentation links, blog post references, configuration option(s), usage suggestions, and other information as appropriate for a given implementation. The initial software support information may also be generated or augmented by content developed by software package developers in association with respective target problem reporting domains and may be retrieved from a memory storage location. Accordingly, the content may initially be empty or include customer support contact information, and the content may be populated and changed throughout the product cycle.

At block 410, the process 400 hosts the URLs at a software update server, such as the software service server 108. It should be noted that the process 400 may be executed by the software service server 108 and as such, hosting the URLs may be performed by the same device that performs the other processing described. Further, it is understood that the hosted software update URLs each reference software support information related to one of a plurality of initial logical/reporting domain components that form a software package. The process 400 returns to decision point 402 and awaits another request to process a software package.

As such, the process 400 provides initial determinations of dynamic problem reporting domains in association with deployment of a software package. URLs are created and support information is associated with the URLs to provide real-time access via the hosted URLs to the software support information. As noted above, the process 400 may be combined with the processing described below as appropriate for a given implementation.

Figure 5A:
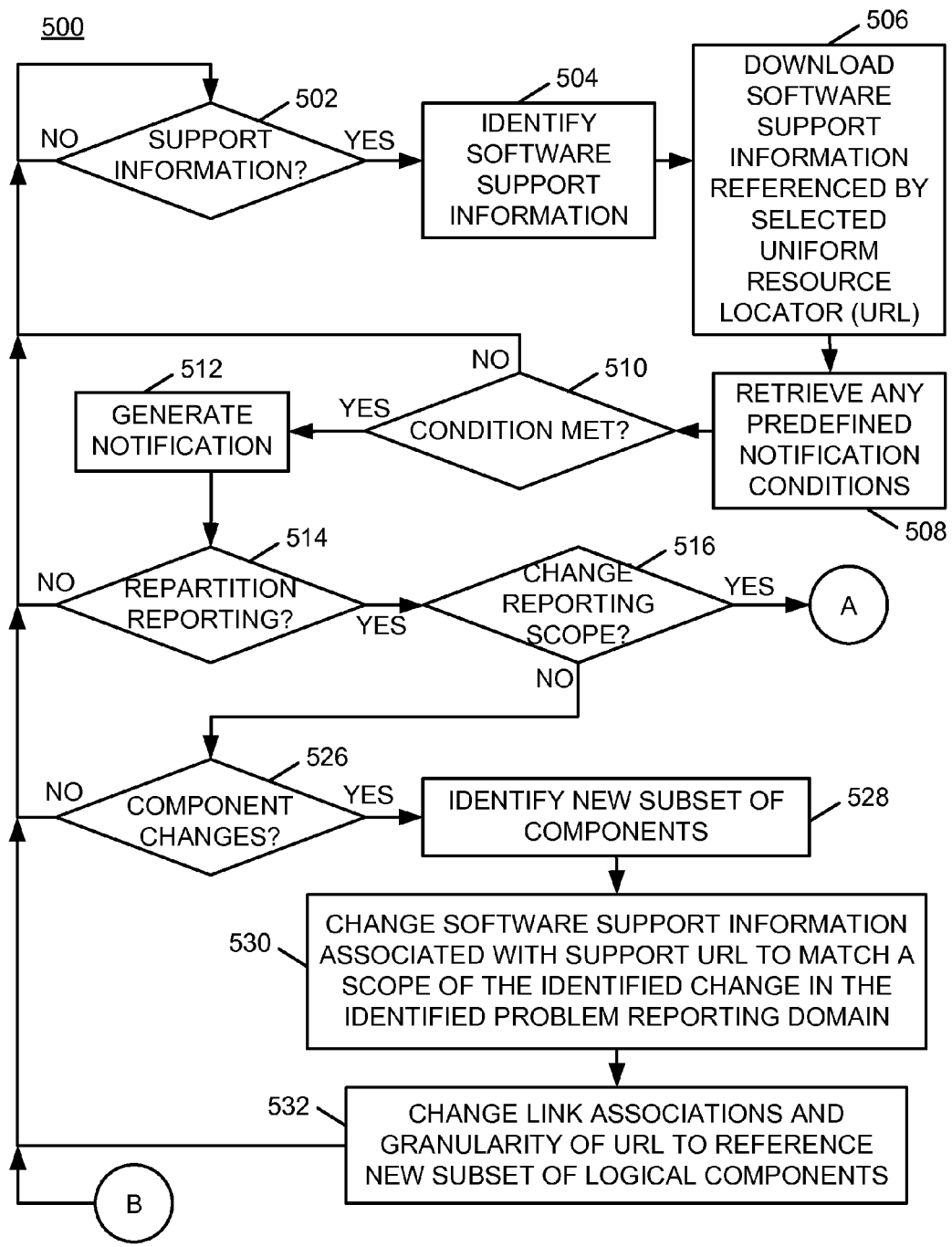
FIG. 5A is a flow chart of an example of an implementation of initial processing within a process for automated service solution delivery in association with a deployed software package according to an embodiment of the present subject matter.
Figure 5B:
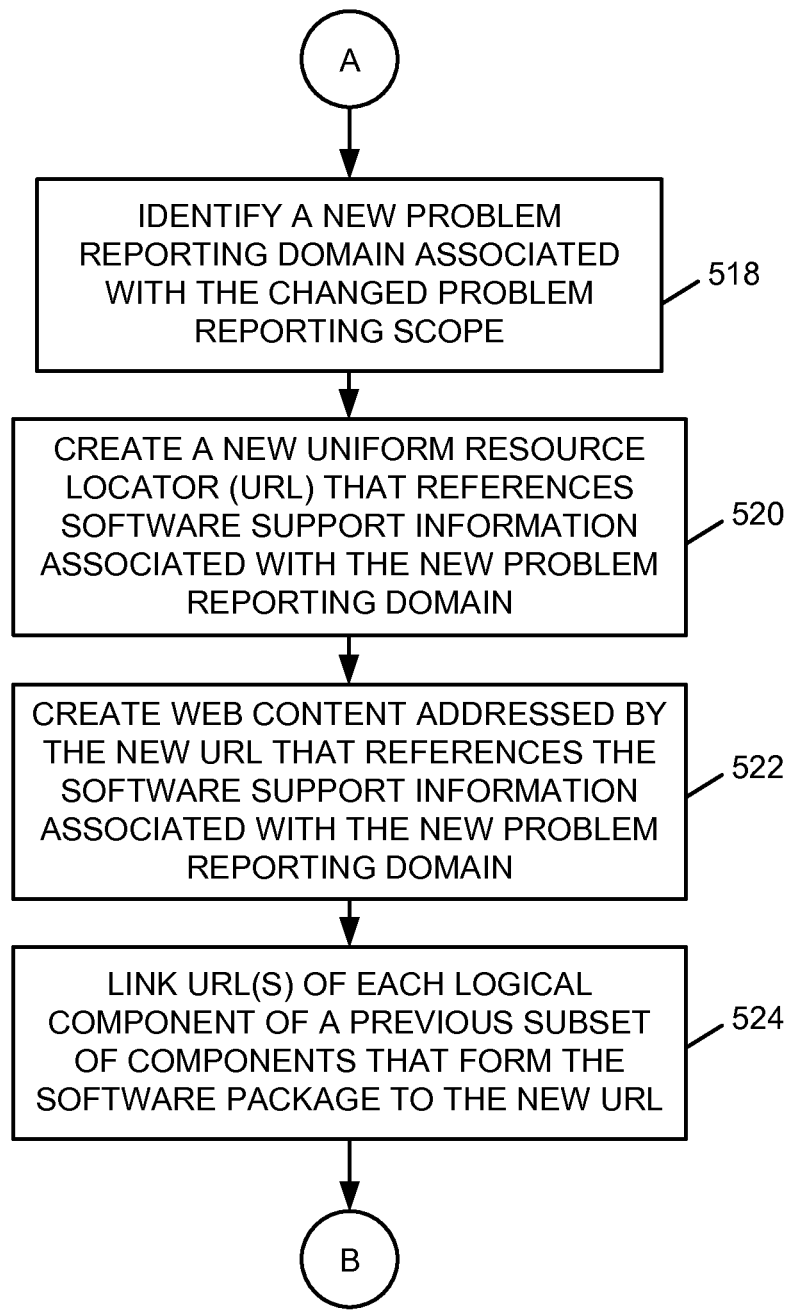
FIG. 5B is a flow chart of an example of an implementation of additional processing within a process for automated service solution delivery in association with a deployed software package according to an embodiment of the present subject matter.

FIGS. 5A-5B illustrate a flow chart of an example of an implementation of a process 500 for automated service solution delivery in association with a deployed software package. FIG. 5A illustrates initial processing within the process 500. At decision point 502, the process 500 makes a determination as to whether a request has been detected for software support information referenced by a selected URL associated with one of the logical components that form the deployed software package. A request for support information may be detected, for example, by the software service server 108 from one of the computing device_1 102 through the computing device_N 104 initiated by a selection at the respective computing device of one of the software update URLs associated with a logical component of a software package. In response to determining that a request has been detected for software support information referenced by a selected URL associated with one of the logical components that form the deployed software package, the process 500 identifies the software support information/content addressed by the selected URL at block 504. At block 506, the process 500 downloads the software support information referenced by the selected URL for the associated logical component.

At block 508, the process 500 retrieves any predefined notification conditions that may be associated with a problem reporting domain of the deployed software packaged associated with the respective software update/support URL. The predefined notification condition(s) may specify one or more notification criteria associated with repartitioning for the problem reporting domain. The predefined notification conditions may be configured by a developer or administrator, and may be considered thresholds or criteria that identify one or more situations in which a notification (e.g., a flag) is to be generated to indicate that a possibility for repartitioning of the logical problem reporting domains exists. For example, if a particular URL is receiving a configured number of selections, then support personnel may wish to be notified so that they may analyze the content to determine whether to repartition the content into a different set of logical components or change a reporting scope. Many possibilities exist for defining notification conditions for generation of notifications and all are considered within the scope of the present subject matter. The process 500 may utilize the timer/clock module 218 in association with one or more predefined notification conditions to further refine the notification criteria based upon frequency of selection or other types of measurements.

At decision point 510, the process 500 makes a determination based upon one or more retrieved predefined notification conditions as to whether the respective predefined notification condition(s) has/have been met. In response to determining that one or more retrieved predefined notification conditions have not been met, the process 500 returns to decision point 502 and iterates as described above.

In response to determining that one or more retrieved predefined notification conditions have been met, the process 500 generates a notification (e.g., sets a flag, sends a message, etc.) indicating the one or more predefined notification conditions have been met at block 512. The process 500 makes a determination at decision point 514 as to whether an instruction to repartition the problem reporting domains for the software package has been received or whether an instruction not to repartition the problem reporting domains for the software package has been received. It is understood that there may be a delay associated with receipt of either instruction and the process 500 may be configured to accommodate any such delay. In response to determining that an instruction not to repartition the problem reporting domains for the software package has been received, the process 500 returns to decision point 502 and iterates as described above.

In response to determining that an instruction to repartition the problem reporting domains for the software package has been received, the process 500 makes a determination at decision point 516 as to whether the instruction was an instruction to change a problem reporting scope associated with the software package. In response to determining that the instruction was an instruction to change the problem reporting scope associated with the software package, the process 500 transitions to the processing shown and described in association with FIG. 5B.

FIG. 5B illustrates additional processing associated with the process 500 for automated service solution delivery in association with a deployed software package. At block 518, the process 500 identifies a new problem reporting domain associated with the changed problem reporting scope. At block 520, the process 500 creates a new URL that references software support information associated with the new problem reporting domain. At block 522, the process 500 creates web content addressed by the new URL that references the software support information associated with the new problem reporting domain. As described above, creation of web content may include creating support information that includes characteristics of the new problem reporting domain. Additional subject matter and links may be provided, such as, to reference a subject area, documentation links, blog post references, configuration option(s), usage suggestions, and other information as appropriate for a given implementation. At block 524, the process 500 links URLs of each logical component of the previous subset of the components that form the software package to the new URL. It should be noted that for a first set of processing after processing by a process such as the process 400 of FIG. 4 described above, the previous subset of the of the logical components that form the software package will be the initial subset of components. Additional iterations of the process 500 may create additional links to initially-created components or to subsequently-created new problem reporting domain links. The process 500 transitions to back the processing shown and described in association with FIG. 5A and returns to decision point 502 and iterates as described above.

Returning to the description of decision point 516, in response to determining not to change a problem reporting scope associated with the software package, the process 500 makes a determination at decision point 526 as to whether the instruction was an instruction to change software component associations of the previous (e.g., "initial" or subsequent) subset of logical components of the software package associated with the selected URL to a new subset of logical components of the software package. In response to determining that the instruction was an instruction to change software component associations of the previous subset of logical components of the software package associated with the selected URL to a new subset of logical components, the process 500 identifies the new subset of components associated with the problem reporting domain at block 528. At block 530, the process 500 changes software support information associated with the support URL to match a scope of the identified change in the problem reporting domain. At block 532, the process 500 changes link associations and granularity of the URL to reference the new subset of logical components. Changing the link associations and granularity of the URL to reference the new subset of logical components may include identifying URLs associated with the new subset of components, creating a new URL to host support information associated with the problem reporting domain, and forwarding URL requests associated with the new subset of components to the new URL. Other possibilities exist for changing the link associations and granularity of the URL to reference the new subset of logical components and all are considered within the scope of the present subject matter. The process 500 returns to decision point 502 and iterates as described above. It should be noted that the process 500 may detect a new request for the software support information referenced by any newly-created software update URL (e.g., initiated by a selection at a computing device of the newly-created software update URL), and may download the software support information related to the identified problem reporting domain and referenced by the newly-created software update URLs in response to such requests.

As such, the process 500 processes requests for support information and tracks the frequency and quantity of such requests. The process 500 determines whether a configured threshold of support requests (e.g., either quantity or quantity relative to frequency) has been met and automatically reparations problem reporting domains as appropriate to either form new problem reporting domains, change a reporting scope associated with a problem reporting domain, and to form new logical component associations with problem reporting domains. The initially-deployed and hosted support information URLs may be mapped to newly-created URLs to achieve a dynamic, flexible, and expandable problem reporting domain in an automated manner. It should be noted that a new URL may be added in response to several situations. For example, where a completely new component is added to software in service, a new URL may be identified and associated with that new component. Additionally, as initial URLs are repartitioned and new URLs are added that are referenced by the initial URLs, the initial URLs may be linked to the new URLs. Many other possibilities exist for adding URLs and all are considered within the scope of the present subject matter.

As described above in association with FIG. 1 through FIG. 5B, the example systems and processes provide automated service solution delivery. Many other variations and additional activities associated with automated service solution delivery are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   by a software update server:
      partitioning different logically-related functional aspects of a software package into different product support problem reporting areas that are independent of software partitioning within the software package;
      creating, for each product support problem reporting area, software support information related to the logically-related functional aspects of the software package partitioned into the respective product support problem reporting area;
      hosting, for each product support problem reporting area, a different problem reporting web-based domain, with each problem reporting web-based domain accessed by one of a plurality of software update uniform resource locators (URLs), where each software update URL provides access to the software support information created for the respective product support problem reporting area;
      linking, within the software package, each software update URL to an error condition associated with the respective logically-related functional aspects of the software package to provide automated access to the respective software update URLs responsive to detected errors in the execution of the software package;
      tracking a frequency and quantity of requests to retrieve the software support information of each product support problem reporting area based upon detected selections of individual ones of the plurality of software update URLs; and
      adjusting, during deployment of the software package, the partitioning of the product support problem reporting areas and the software update URL error condition linkages within the software package based, at least in part, upon the tracked frequency and quantity of requests.

2. The method of claim 1, where the software update server hosting, for each product support problem reporting area, the different problem reporting web-based domain comprises the software update server:
   identifying an initial plurality of problem reporting web-based domains associated with the partitioned product support problem reporting areas of the software package;
   creating the plurality of software update URLs; and
   creating, for each software update URL, web content that comprises the software support information created for the respective product support problem reporting area.

3. The method of claim 1, further comprising the software update server:
   retrieving at least one predefined notification condition associated with a product support problem reporting area of the software package that specifies at least one notification criterion associated with repartitioning of the product support problem reporting area;
   determining that the retrieved at least one predefined notification condition has been met by one of the tracked frequency and the tracked quantity of requests to retrieve the software support information of the product support problem reporting area based upon the detected selections of the software update URL that accesses the software support information; and
   generating a notification indicating the at least one predefined notification condition has been met; and
   where adjusting, during the deployment of the software package, the partitioning of the product support problem reporting areas and the software update URL error condition linkages within the software package based, at least in part, upon the tracked frequency and quantity of requests comprises the software update server:
      receiving an instruction to repartition the product support problem reporting areas into a new set of product support problem reporting areas, and responsive to the instruction:
         (i) repartitioning the product support problem reporting areas into the new set of product support problem reporting areas; and
         (ii) changing the software update URL error condition linkages within the software package based upon the repartitioning of the product support problem reporting areas into the new set of product support problem reporting areas.

4. The method of claim 1, where a scope of the product support problem reporting areas and the software support information accessed by the plurality of software update URLs is dynamically modifiable and adaptive to problem identification as part of automated service solution delivery during deployment of the software package, and further comprising the software update server one of:
   changing a product support problem reporting scope of at least one of the product support problem reporting areas; and changing the logically-related functional aspects of at least one of the product support problem reporting areas.

5. The method of claim 1, further comprising the software update server:
   identifying a new logically-related functional aspect of the software package;
   creating a new product support problem reporting area associated with the new logically-related functional aspect of the software package;
   creating new software support information related to the new logically-related functional aspect of the new product support problem reporting area;
   creating a new problem reporting web-based domain, accessed by a new software update URL, that provides access to the new software support information created for the new product support problem reporting area; and
   linking, within the software package, the new software update URL to a new error condition associated with the new logically-related functional aspect of the software package to provide automated access to the new software update URL responsive to a detected error in the execution of the software package associated with the new error condition.

6. The method of claim 1, further comprising the software update server:
   identifying a new subset of the logically-related functional aspects of the software package associated with at least two of the product support problem reporting areas;
   identifying software update URLs associated with the new subset of the at least two product support problem reporting areas;
   creating a new software update URL to host support information associated with the new subset of the logically-related functional aspects of the software package;
   linking, during the deployment of the software package and within the software package, the new software update URL to an error condition associated with the new subset of the logically-related functional aspects of the software package to provide automated access to the new software update URL responsive to detected errors in the execution of the software package associated with the new subset of the logically-related functional aspects of the software package; and
   linking software update URL requests associated with the at least two product support problem reporting areas to the new software update URL.

7. The method of claim 1, where the software support information accessed by the software update URLs comprises, for each product support problem reporting area, a combination of a documentation link, a reference to a blog post, a configuration option, and a usage suggestion associated with the respective logically-related functional aspect of the software package.

8. A system, comprising:
   a communication interface; and
   a processor programmed to:
      partition different logically-related functional aspects of a software package into different product support problem reporting areas that are independent of software partitioning within the software package;
      create, for each product support problem reporting area, software support information related to the logically-related functional aspects of the software package partitioned into the respective product support problem reporting area;
      host, for each product support problem reporting area, a different problem reporting web-based domain, with each problem reporting web-based domain accessed by one of a plurality of software update uniform resource locators (URLs), where each software update URL provides access to the software support information created for the respective product support problem reporting area;
      link, within the software package, each software update URL to an error condition associated with the respective logically-related functional aspects of the software package to provide automated access to the respective software update URLs responsive to detected errors in the execution of the software package;
      track a frequency and quantity of requests via the communication interface to retrieve the software support information of each product support problem reporting area based upon detected selections of individual ones of the plurality of software update URLs; and
      adjust, during deployment of the software package, the partitioning of the product support problem reporting areas and the software update URL error condition linkages within the software package based, at least in part, upon the tracked frequency and quantity of requests.

9. The system of claim 8, where, in being programmed to host, for each product support problem reporting area, the different problem reporting web-based domain, the processor is programmed to:
   identify an initial plurality of problem reporting web-based domains associated with the partitioned product support problem reporting areas of the software package;
   create the plurality of software update URLs; and
   create, for each software update URL, web content that comprises the software support information created for the respective product support problem reporting area.

10. The system of claim 8, where the processor is further programmed to:
   retrieve at least one predefined notification condition associated with a product support problem reporting area of the software package that specifies at least one notification criterion associated with repartitioning of the product support problem reporting area;
   determine that the retrieved at least one predefined notification condition has been met by one of the tracked frequency and the tracked quantity of requests to retrieve the software support information of the product support problem reporting area based upon the detected selections of the software update URL that accesses the software support information; and
   generate a notification indicating the at least one predefined notification condition has been met; and
   where, in being programmed to adjust, during the deployment of the software package, the partitioning of the product support problem reporting areas and the software update URL error condition linkages within the software package based, at least in part, upon the tracked frequency and quantity of requests, the processor is programmed to:
   receive an instruction to repartition the product support problem reporting areas into a new set of product support problem reporting areas, and responsive to the instruction:
      (i) repartition the product support problem reporting areas into the new set of product support problem reporting areas; and (ii) change the software update URL error condition linkages within the software package based upon the repartitioning of the product support problem reporting areas into the new set of product support problem reporting areas.

11. The system of claim 8, where a scope of the product support problem reporting areas and the software support information accessed by the plurality of software update URLs is dynamically modifiable and adaptive to problem identification as part of automated service solution delivery during deployment of the deployed software package, and where the processor is further programmed to one of:
change a product support problem reporting scope of at least one of the product support problem reporting areas; and
change the logically-related functional aspects of at least one of the product support problem reporting areas.

12. The system of claim 8, where the processor is further programmed to:
identify a new logically-related functional aspect of the software package;
create a new product support problem reporting area associated with the new logically-related functional aspect of the software package;
create new software support information related to the new logically-related functional aspect of the new product support problem reporting area;
create a new problem reporting web-based domain, accessed by a new software update URL, that provides access to the new software support information created for the new product support problem reporting area; and
link, within the software package, the new software update URL to a new error condition associated with the new logically-related functional aspect of the software package to provide automated access to the new software update URL responsive to a detected error in the execution of the software package associated with the new error condition.

13. The system of claim 8, where the software support information accessed by the software update URLs comprises, for each product support problem reporting area, a combination of a documentation link, a reference to a blog post, a configuration option, and a usage suggestion associated with the respective logically-related functional aspect of the software package.

14. A computer program product comprising a computer readable storage medium including computer readable program code, where the computer readable program code when executed on a computer causes the computer to:
partition different logically-related functional aspects of a software package into different product support problem reporting areas that are independent of software partitioning within the software package;
create, for each product support problem reporting area, software support information related to the logically-related functional aspects of the software package partitioned into the respective product support problem reporting area;
host, for each product support problem reporting area, a different problem reporting web-based domain, with each problem reporting web-based domain accessed by one of a plurality of software update uniform resource locators (URLs), where each software update URL provides access to the software support information created for the respective product support problem reporting area;
link, within the software package, each software update URL to an error condition associated with the respective logically-related functional aspects of the software package to provide automated access to the respective software update URLs responsive to detected errors in the execution of the software package;
track a frequency and quantity of requests to retrieve the software support information of each product support problem reporting area based upon detected selections of individual ones of the plurality of software update URLs; and
adjust, during deployment of the software package, the partitioning of the product support problem reporting areas and the software update URL error condition linkages within the software package based, at least in part, upon the tracked frequency and quantity of requests.

15. The computer program product of claim 14, where in causing the computer to host, for each product support problem reporting area, the different problem reporting web-based domain, the computer readable program code when executed on the computer causes the computer to:
identify an initial plurality of problem reporting web-based domains associated with the partitioned product support problem reporting areas of the software package;
create the plurality of software update URLs; and
create, for each software update URL, web content that comprises the software support information created for the respective product support problem reporting area.

16. The computer program product of claim 14, where the computer readable program code when executed on the computer further causes the computer to:
retrieve at least one predefined notification condition associated with a product support problem reporting area of the software package that specifies at least one notification criterion associated with repartitioning of the product support problem reporting area;
determine that the retrieved at least one predefined notification condition has been met by one of the tracked frequency and the tracked quantity of requests to retrieve the software support information of the product support problem reporting area based upon the detected selections of the software update URL that accesses the software support information; and
generate a notification indicating the at least one predefined notification condition has been met; and
where, in causing the computer to adjust, during the deployment of the software package, the partitioning of the product support problem reporting areas and the software update URL error condition linkages within the software package based, at least in part, upon the tracked frequency and quantity of requests, the computer readable program code when executed on the computer causes the computer to:
receive an instruction to repartition the product support problem reporting areas into a new set of product support problem reporting areas, and responsive to the instruction:
(i) repartition the initial plurality of product support problem reporting areas into the new set of product support problem reporting areas; and
(ii) change the software update URL error condition linkages within the software package based upon the repartitioning of the product support problem reporting areas into the new set of product support problem reporting areas.

17. The computer program product of claim 14, where a scope of the product support problem reporting areas and the software support information accessed by the plurality of software update URLs is dynamically modifiable and adaptive to problem identification as part of automated service solution delivery during deployment of the software package, and where the computer readable program code when executed on the computer further causes the computer to one of:
- change a product support problem reporting scope of at least one of the product support problem reporting areas; and
- change the logically-related functional aspects of at least one of the product support problem reporting areas.

18. The computer program product of claim 14, where the computer readable program code when executed on the computer further causes the computer to:
- identify a new logically-related functional aspect of the software package;
- create a new product support problem reporting area associated with the new logically-related functional aspect of the software package;
- create new software support information related to the new logically-related functional aspect of the new product support problem reporting area;
- create a new problem reporting web-based domain, accessed by a new software update URL, that provides access to the new software support information created for the new product support problem reporting area; and
- link, within the software package, the new software update URL to a new error condition associated with the new logically-related functional aspect of the software package to provide automated access to the new software update URL responsive to a detected error in the execution of the software package associated with the new error condition.

19. The computer program product of claim 14, where the computer readable program code when executed on the computer further causes the computer to:
- identify a new subset of the logically-related functional aspects of the software package associated with at least two of the product support problem reporting areas;
- identify software update URLs associated with the new subset of the at least two product support problem reporting areas;
- create a new software update URL to host support information associated with the new subset of the logically-related functional aspects of the software package;
- link, during the deployment of the software package and within the software package, the new software update URL to an error condition associated with the new subset of the logically-related functional aspects of the software package to provide automated access to the new software update URL responsive to detected errors in the execution of the software package associated with the new subset of the logically-related functional aspects of the software package; and
- link software update URL requests associated with the at least two product support problem reporting areas to the new software update URL.

20. The computer program product of claim 14, where the software support information accessed by the software update URLs comprises, for each product support problem reporting area, a combination of a documentation link, a reference to a blog post, a configuration option, and a usage suggestion associated with the respective logically-related functional aspect of the software package.

* * * * *